United States Patent [19]

Keogh

[11] Patent Number: 4,707,520
[45] Date of Patent: Nov. 17, 1987

[54] COMPOSITION BASED ON WATER-CURABLE THERMOPLASTIC POLYMERS AND METAL CARBOXYLATE SILANOL CONDENSATION CATALYSTS

[75] Inventor: Michael J. Keogh, Bridgewater, N.J.

[73] Assignee: Union Carbide Corporation, Danbury, Conn.

[21] Appl. No.: 767,872

[22] Filed: Aug. 21, 1985

[51] Int. Cl.$^4$ .............................................. C08F 8/00
[52] U.S. Cl. .................................. 525/245; 525/288; 525/326.5; 525/342; 525/370
[58] Field of Search ................ 525/245, 288, 342, 370

[56] References Cited

U.S. PATENT DOCUMENTS 3,646,155  2/1972  Scott .................................. 260/827
4,157,321  6/1979  Kawakami et al. .................. 524/264
4,181,687  1/1980  Ward et al. ......................... 524/100
4,247,354  1/1981  Ward et al. ......................... 156/329
4,291,136  9/1981  Keogh ................................. 525/102
4,328,323  5/1982  Keogh ................................. 525/102

Primary Examiner—Joseph L. Schofer
Assistant Examiner—Bernard Lipman
Attorney, Agent, or Firm—S. R. Bresch

[57] ABSTRACT

Water-curable compositions, based on thermoplastic polymers having pendant thereto hydrolyzable silane moieties and metal carboxylate silanol condensation catalysts, which can be water cured in a relatively short period of time to crosslinked products characterized by an excellent balance of commercially acceptable properties. The compositions of this invention are particularly useful as extrudates about wires and cables.

24 Claims, 1 Drawing Figure

Rheometer vs. Percent Extractables

Rheometer vs. Percent Extractables
Actual Determinations

| Rheometer (lbs-inch) | % Extractables |
|---|---|
| 57 | 13 |
| 37 | 18 |
| 33 | 22 |
| 28 | 25 |
| 27 | 27 |
| 21 | 29.5 |
| 15 | 39.5 |
| 11 | 41 |

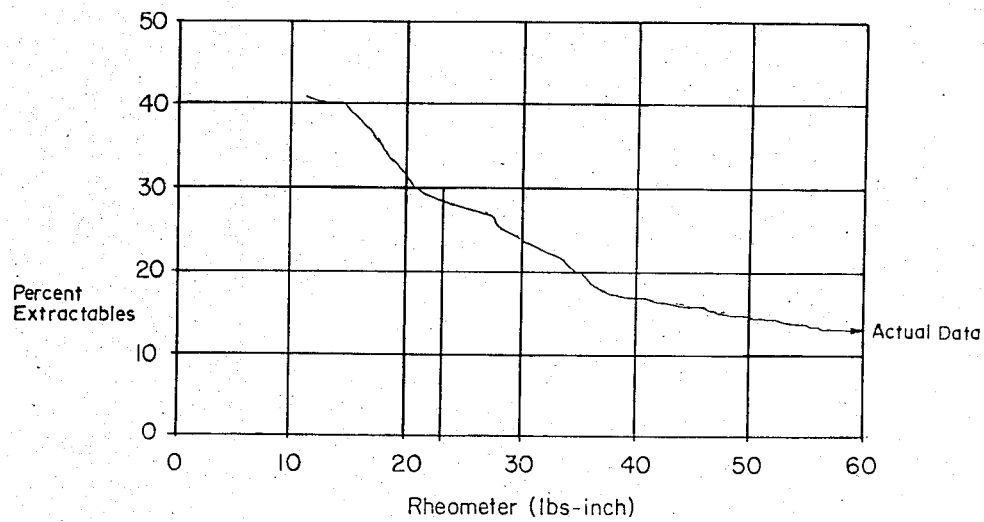
Rheometer vs. Percent Extractables
Rheometer vs. Percent Extractables
Actual Determinations
| Rheometer (lbs-inch) | % Extractables |
|---|---|
| 57 | 13 |
| 37 | 18 |
| 33 | 22 |
| 28 | 25 |
| 27 | 27 |
| 21 | 29.5 |
| 15 | 39.5 |
| 11 | 41 |

COMPOSITION BASED ON WATER-CURABLE THERMOPLASTIC POLYMERS AND METAL CARBOXYLATE SILANOL CONDENSATION CATALYSTS

SUMMARY OF THE INVENTION

This invention relates to water-curable compositions, based on thermoplastic polymers having hydrolyzable silane moieties and metal carboxylate silanol condensation catalysts, which can be water-cured in a relatively short period of time to crosslinked products characterized by an excellent balance of commercially acceptable properties. The compositions of this invention are particularly useful as extrudates about wires and cables.

Currently, two major processes, so-called peroxide-curing and water-curing, are being employed in the application of protective coatings such as insulation and jacketing about wires and cables. The peroxide-curing process involves extruding compositions containing an organic peroxide about wires and cables and subjecting the resultant articles to elevated temperatures in order to cure the compositions to crosslinked products. The overall operation requires careful control of process parameters in order to avoid undue heat and pressure build-up in the extruder. Undue heat and pressure build-up results in premature decomposition of the peroxides which in turn results in crosslinking of the compositions in the extruder. Crosslinking of the compositions in the extruder, commonly referred to as "scorch", necessitates, in extreme cases, stopping the operation and cleaning the extruder. In situations wherein "scorch" occurs but is not as severe, it has been found that the work-life of the ultimate coatings is relatively short. In addition to the processing difficulties of peroxide-curing, the peroxide containing compositions do not have that degree of resistivity to deformation, at normal peroxide loadings, demanded by many ultimate users of insulated and jacketed wire and cable articles.

The water-curing process, on the other hand, involves compositions containing water-curable thermoplastic polymers having hydrolyzable silane moieties and is more commercially attractive in that a wider latitude in processing conditions is possible. That is, compositions containing water-curable polymers having hydrolyzable silane moieties can be extruded at temperatures far in excess of maximum processing temperatures used in extruding peroxide containing compositions. Being capable of extrusion at higher temperatures, such compositions can be extruded at faster rates and under lower pressures and consequently are more cost effective.

A disadvantage with respect to the so-called water-curing process, however, is the water sensitivity of the compositions involved. Compositions containing water-curable thermoplastic polymers having hydrolyzable silane moieties tend to crosslink under normal conditions of handling and storage. As a result, the relatively poor shelf life of such compositions has limited the wide commercial acceptance of the water-curing process in the United States.

Modification of the water-curing process, which eliminates the problem of poor shelf life while preserving its attractive attributes, is described in my U.S. Pat. No. 4,526,930 patented July 2, 1985. According to the invention disclosed and claimed in U.S. Pat. No. 4,526,930, a relatively water-stable thermoplastic polymer having hydrolyzable silane moieties is activated or made readily water-curable by the reaction therewith of an organo titanate having at least one readily hydrolyzable group, which ester exchanges with an ester group of the silane.

BRIEF DESCRIPTION OF THE DRAWING

The drawing,

FIG. 1, is a graph showing percent extractables plotted against rheometer determinations of a commercially available polymer, polyethylene, silane modified with vinyltrimethoxy silane.

DETAILED DESCRIPTION OF THE INVENTION

The present invention provides water-curable compositions which are characterized by relatively fast cure rates, in the absence of organo titanates. Consequently, the compositions are particularly attractive from a commercial standpoint as they can be water-cured quickly, without the necessity of adding thereto relatively expensive and sometimes unavailable organo titanates, to crosslinked products characterized by an excellent balance of commercially acceptable properties, including an acceptable solvent extractables level, a percent crosslinking of at least about 50 percent and a rheometer reading after immersion in 70° C. water for 16 hours, conditions under which polymers are crosslinked commercially, of at least about 20 lbs-inch.

As to tests conducted to determine the "potential" of water-curable polymers, Monsanto Rheometer test is a laboratory diagnostic test capable of rapidly measuring the degree of cross-linking in polymers by a high temperature viscosity measurement. In commercial practice, however, the degree of crosslinking is measured by determining the amount of material that can be extracted by subjecting the crosslinked polymer to a hot solvent. High levels of extractables indicate a low level of crosslinking and vice-versa.

Standards for degree of crosslinking have been set for specific polymers to be used in specific applications. For example, one widely used set of specifications for crosslinked ethylene polymers to be used as insulation material in wire and cable applications is the Insulated Cable Engineers Association and National Electrical Manufacturers Association (ICEA/NEMA) Standards Publications ICEA No. S-66-524 and NEMA No. K/C-7-1982. These specfications set the standard for an acceptable degree of crosslinking. In the case of a crosslinked ethylene polymer to be used as insulation, the standard is a maximum of about 30 percent decalin solvent extractables.

Plotting the percent extractables values, as the ordinate against rheometer measurements, as the abscissa, one is able to predict the commercial potential of a particular polymer, having in hand the same data with respect to a commercial polymer. Such data for a water-curable, silane modified, commercial polyethylene is shown in FIG. 1 which is a graph, plotting percent extractables versus rheometer determinations. As can be seen from FIG. 1, a maximum percent extractable level of about 30 percent, for a commercially accepted product is achieved at a rheometer of about 20 lbs-inch.

The compositions of this invention comprise a relatively water-stable, thermoplastic polymer having pendant thereto silane moieties of the formula:

FORMULA I

wherein R is a straight chain hydrocarbon radical having a minimum of 4 carbon atoms, generally having 4 to 18 carbon atoms inclusive or a branched chain hydrocarbon radical having a minimum of 3 carbon atoms, generally having 3 to 18 carbon atoms inclusive, and as the sole silanol condensation catalyst, a metal carboxylate in an amount of at least about 0.1 percent by weight, generally about one to about 5 percent by weight, and preferably about 0.25 to about one percent by weight, based on the weight of the relatively water-stable silane modified thermoplastic polymer.

In the definition of a branched chain hydrocarbon radical having a minimum of 3 carbon atoms is included a hydrocarbon radical attached to the oxygen atom of the silane through a non-terminal carbon atom.

With respect to Formula I, illustrative of suitable straight chain hydrocarbon radicals for R are alkyl radicals such as n-butyl, n-hexyl, n-heptyl, n-octyl, n-nonyl, n-decyl, n-dodecyl, stearyl, myristyl and the like.

Illustrative of suitable branched chain hydrocarbon radicals for R are alkyl radicals such as isopropyl, sec-butyl, sec-amyl, 4-methyl-2-pentyl and the like.

Each V, which can be the same or different, is a hydrocarbon radical having 1 to 18 carbon atoms inclusive or —(OR) wherein R is a previously defined.

Illustrative of suitable hydrocarbon radicals for each V are alkyl radicals having 1 to 18 carbon atoms inclusive, preferably 1 to 6 carbon atoms inclusive such as methyl, ethyl, n-propyl, isopropyl, n-butyl, n-hexyl and the like; aryl radicals having 6 to 8 carbon atoms inclusive such as phenyl, methylphenyl, ethylphenyl and the like; cycloaliphatic radicals having 5 to 8 carbon atoms inclusive such as cyclopentyl, cyclohexyl and the like.

Preparation of thermoplastic polymers having pendant silane moieties falling within the scope of Formula I can be carried out by a number of convenient processes, utilizing free radical generating compounds, including:

A. Reacting a thermoplastic polymer with an appropriate vinyl silane in the presence of an organic peroxide as described in U.S. Pat. No. 3,646,155, patented Feb. 29, 1972.

B. Reacting olefinic monomer with an appropriate unsaturated silane in the presence of a peroxide as described in U.S. Pat. No. 3,225,018, patented Dec. 21, 1965.

C. Reacting a thermoplastic polymer with a silane sulfonyl azide as described in U.S. Pat. No. 3,697,551, patented Oct. 10, 1972.

Illustrative of thermoplastic polymers which can be reacted with silanes, according to Process A, identified above, are normally solid homopolymers and interpolymers of monoolefins and diolefins.

Suitable polymerizable monoolefins have the general formula:

$$C_\alpha H_{2\alpha} \qquad \text{FORMULA II}$$

wherein α has a value of at least 2. Exemplary of olefins falling within the scope of Formula II are: ethylene, propylene, butene-1, pentene-1, 4-methyl-pentene-1, hexene-1, heptene-1, octene-1 and the like.

Suitable polymerizable diolefins have the general formula:

$$C_\beta H_{2\beta-2} \qquad \text{FORMULA III}$$

wherein β has a value of at least 3. Exemplary of diolefins falling within the scope of Formula III are: 1,4-pentadiene, 1,4-hexadiene, 1,5-hexadiene, 1,4-octadiene, ethylidene norbornene and the like.

Illustrative of monomers which can be polymerized with monoolefins and/or diolefins are styrene, p-methyl styrene, α-methyl styrene, p-chloro styrene, vinyl naphthalene and similar aryl olefins and substituted aryl olefins; nitriles such as acrylonitrile, methacrylonitrile, α-chloroacrylonitrile and the like; vinyl methyl ketone, vinyl methyl ether, vinylidene chloride, and vinylacetate; alkyl acrylates which fall within the scope of the following formula:

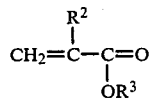

FORMULA IV wherein $R^2$ is hydrogen or methyl and $R_3$ is alkyl having 1 to 8 carbon atoms inclusive. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate, chloroethyl acrylate and the like; provided that the olefinic content is at least about 0.1 percent by weight, preferably about 1 to about 50 percent by weight.

Desirable polymers are alkylene-alkyl acrylate copolymers generally having a density (ASTM D-1505 with conditioning as in ASTM D-147-42) of about 0.92 to about 0.94 and a melt index (ASTM D-1238 at 44 psi tested pressure) of about 0.1 to about 500 decigrams per minute. These copolymers generally have about 1 to about 60 percent by weight combined alkyl acrylate, preferably about 5 to about 45 percent by weight combined alkyl acrylate.

Preferred polymers are ethylene-propylene copolymers, ethylene-butene copolymers, ethylene-hexene copolymers and the like produced under low pressures on the order of about 15 to about 300 psi, using a chromium oxide catalyst modified with titanium as disclosed in U.S. Pat. No. 4,011,382, patented Mar. 8, 1977.

Particularly preferred polymers have densities (ASTM D-1505) of about 0.875 to about 0.970, preferably about 0.875 to about 0.930. These polymers can be prepared by reacting a mixture containing about 50 to about 99.9 mole percent, preferably about 75 to about 96 mole percent ethylene and from about 0.1 to about 50 mole percent and preferably about 4 to about 25 mole percent of one or more $C_3$ to $C_8$ alpha olefins as previously described.

It is to be understood that mixtures of reactants can be polymerized to produce suitable polymers.

Illustrative of monomers and mixtures thereof to be reacted with an appropriate silane in accordance with Process B are the olefinic monomers previously described.

Silanes suitable for purposes of this invention include, among others, silanes having the formula:

FORMULA V

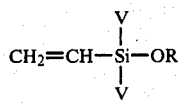

wherein R and V are as previously defined, such as vinyl-tris(isopropoxy)silane, vinyl-tris(n-butoxy)silane, vinyl-tris(sec-butoxy)silane, vinyl-tris(isobutoxy)silane, vinyl-tris(n-pentoxy)silane, vinyl-tris(n-hexoxy)silane, vinyl-tris(2-ethylhexoxy-1)silane, vinyl-tris(n-heptoxy)silane, vinyl-tris(n-octyl)silane, vinyl-tris(n-dodecyloxy)silane, vinyl-bis(n-butoxy)methyl silane, vinyl-bis(n-pentoxy)methyl silane, vinyl-bis(n-hexoxy)methyl silane, vinyl-(n-butoxy)dimethyl silane, vinyl(n-pentoxy)dimethyl silane and the like; unsaturated silanes having the formula:

FORMULA VI

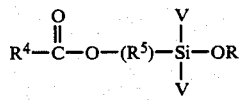

wherein $R^4$ is an unsaturated hydrocarbon radical such as an alkylene radical having 2 to 18 carbon atoms inclusive, preferably 2 to 4 carbon atoms inclusive such as ethylene, propylene and the like, and R and each V are as previously defined.

Illustrative of suitable radicals for $R^5$ are alkylene radicals having 1 to 18 carbon atoms inclusive, preferably 1 to 6 carbon atoms inclusive, such as methylene, ethylene, propylene, butylene, hexylene and the like; alkoxy radicals having 1 to 18 carbon atoms inclusive, preferably 1 to 6 carbon atoms inclusive such as methyloxymethyl, methyloxypropyl, ethyloxyethyl, ethyloxypropyl, propyloxypropyl, propyloxybutyl, propyloxyhexyl and the like.

Exemplary of suitable silanes falling within the scope of Formula VI are the following:

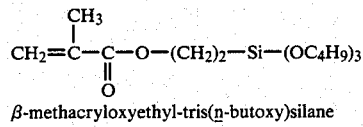

β-methacryloxyethyl-tris(n-butoxy)silane

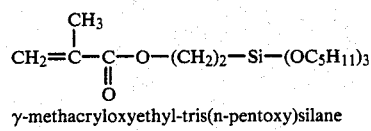

γ-methacryloxyethyl-tris(n-pentoxy)silane

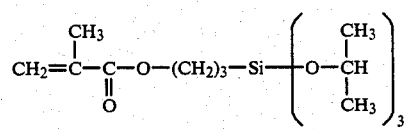

γ-methacryloxypropyltris(isopropoxy)silane

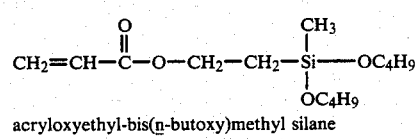

acryloxyethyl-bis(n-butoxy)methyl silane

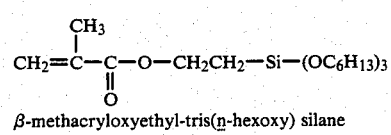

β-methacryloxyethyl-tris(n-hexoxy) silane

-continued

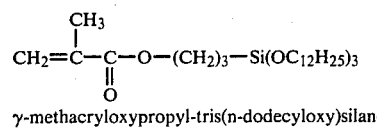

γ-methacryloxypropyl-tris(n-dodecyloxy)silane

Suitable metal carboxylate condensation catalysts for purposes of the present invention are exemplified by Group IVa metal salts of carboxylic acids or carboxylic acid anhydrides.

Illustrative of suitable metal carboxylate silanol condensation catalysts are dibutyltin dilaurate, dibutyltin maleate, dioctyltin maleate, stannous acetate, stannous octoate, lead naphthenate and the like.

It is preferred to add the metal carboxylates to the silane modified thermoplastic polymers as a masterbatch in a thermoplastic polymer matrix. Polymers suitable for use as matrices are disclosed in U.S. Pat. No. 4,369,289 and include polyethylenes and the like.

The crosslinking of the composition of this invention is effected by exposing the polymer to moisture.

The rate of crosslinking or curing can be accelerated by exposure to an artificially humidified atmosphere, immersion in heated water or exposure to steam.

Generally, curing is effected at temperatures on the order of about 0° C. to about 100° C., preferably about 70° C. to about 100° C.

To the compositions of this invention may be added various additives, in amounts well known in the art, such as fillers among which can be mentioned carbon black, clay, talc (magnesium silicate), calcium carbonate, silica, aluminum trihydrate, magnesium hydroxide and the like as are disclosed in U.S. Pat. No. 4,446,279.

The compositions can be rendered flame retardant by the addition thereto of halogen containing flame retardants such as decabromodiphenyl oxide, chlorinated polyethylene, polyvinyl chloride and halogenated paraffin waxes, alone or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

Particularly desirable additives, especially when hydrous and/or water containing fillers are contained in the compositions, are monomeric, hydrolytically reactive silanes as disclosed in this specification, in U.S. Pat. No. 4,181,687 and in pages 60–70 of a book entitled, "Silicon Compounds Register and Review", published by Petrarch Systems of Bristol, Pa.

The addition of monomeric, hydrolytically reactive organo silanes to the compositions, added immediately prior to or concurrently with the silanol condensation catalysts, insures no undesirable increase in viscosity of the resultant compositions prior to the crosslinking cycle. Increase in viscosity makes more difficult extrusion of the compositions of this invention, for instance, as jacketing and insulation about wires and cables.

Amounts of monomeric, hydrolytically reactive organo silanes added are sufficient to prevent an undesirable increase in viscosity of the compositions, and will depend, in part, upon the water content of the silane modified thermoplastic resin and/or the water content of other components of the compositions. As a rule, amounts added are about 0.05 to about 5, preferably about 0.25 to about 1 percent by weight based on the weight of the composition.

It is to be noted that the disclosures of all patents noted are incorporated herein by reference. Also, mixtures of materials can be used in carrying out this invention.

The following examples further illustrate the present invention and are not intended to limit the scope thereof.

Preparation of silane modified ethylene polymers by grafting a hydrolyzable silane to an ethylene-ethyl acrylate copolymer by use of a free radical generating compound was carried out as follows:

A Brabender mixer was heated to a temperature of 130° C. and to the heated Brabender there was added a polymer and polymerized 1,2-dihydro-2,3,4-trimethyl quinoline, an antioxidant. The mixture was fluxed to a blend and to the blend there was added the hydrolyzable silane. The resultant mixture was then brought to a stable torque. At this point, the peroxide was added to the contents of the Brabender as a masterbatch in polyethylene and blended in. The contents of the Brabender were slowly heated to a temperature of 185° C. After 5 minutes at a temperature of 185° C., silane modified polymer was discharged from the Brabender and stored under argon gas.

The materials used in preparing the silane modified polymers are set forth below, in parts by weight.

|  | Polymer 1 | Polymer A |
|---|---|---|
| Ethylene-ethyl acrylate copolymer having a melt index of 3.5 and containing 17 percent combined ethyl acrylate | 100 | 100 |
| Vinyltrimethoxy silane | 4.41 | — |
| Vinyl-tris(n-dodecyloxy) silane | — | 18.23 |
| Polymerized 1,2-dihydro-2,3,4-trimethyl quinoline | 0.12 | 0.12 |
| Polyethylene masterbatch containing 1.5 percent by weight di-α-cumyl peroxide | 17.6 | 17.6 |

The polyethylene of the masterbatch had a melt index of 2.0.

Polymer 1 and Polymer A were prepared using the same equivalent amounts of silane. Also, Polymer 1 was prepared with vinyltrimethoxy silane, a silane used to prepare silane modified polymers of commerce.

Rheometer determinations were made with respect to the silane modified polymers, as prepared, and after the addition thereto of a metal carboxylate, dibutyltin dilaurate. Rheometer determinations, which are indicative of the degree of crosslinking, were carried out by forming plaques from the silane modified polymers and subjecting the plaques to the Monsanto Rheometer test. This test procedure is described in U.S. Pat. No. 4,018,852 to Donald L. Schober, patented Apr. 19, 1977. Test plaques, having dimensions of 3 inches by 3 inches by 0.075 inch were prepared in a press under the following conditions:

Time of cycle—5 minutes
Temperature—110° C.–115° C.
Pressure—5,000 psig

TABLE I

| Percent by weight dibutyltin dilaurate | Polymer 1 Rheometer (lbs-inch) | | Polymer A Rheometer (lbs-inch) | |
|---|---|---|---|---|
| | Original | After Tin Addition | Original | After Tin Addition |
| 0.03 | 4 | 12 | 3 | 4 |
| 0.10 | 4 | 14 | 3 | 4 |
| 0.50 | 4 | 19 | 3 | 4 |
| 1.0 | 4 | 19 | 3 | 5 |

As shown by the data, the vinyltrimethoxy silane modified polymer is significantly more susceptible to premature crosslinking than the vinyl-tris(n-dodecyloxyl)silane modified polymer.

On subjecting the compositions (plaques) of Table I to water for periods of time and at the temperatures of water indicated, however, the compositions containing Polymer A exhibited cure speeds equal to or approaching the cure speeds of compositions of commerce, containing Polymer 1, at metal carboxylate loadings of at least about 0.1 percent by weight. This is shown by the data of Table II. Extrapolating the rheometer readings of Table II in reference to the drawing, both Polymer 1 and Polymer A reached a percent extractables level at approximately the same point.

TABLE II

| | Cure Speed As A Function of Amount Of The Metal Carboxylate | | | | | | | |
|---|---|---|---|---|---|---|---|---|
| | Polymer 1 | | | | Polymer A | | | |
| | Control 1 | Control 2 | Control 3 | Control 4 | Control 5 | Example 1 | Example 2 | Example 3 |
| Percent by weight dibutyltin dilaurate | 0.03 | 0.1 | 0.5 | 1.0 | 0.03 | 0.1 | 0.5 | 1.0 |
| Original Rheometer (lbs-inch) | 4 | 4 | 4 | 4 | 3 | 3 | 3 | 3 |
| After tin Addition (lbs-inch) | 12 | 14 | 19 | 19 | 4 | 4 | 4 | 5 |
| 1 Hr/70° C., (lbs-inch) | 18 | 20 | 26 | 26 | 5 | 11 | 15 | 22 |
| 4 Hrs/70° C., (lbs-inch) | 20 | 24 | 26 | 28 | 6 | 12 | 24 | 26 |
| 16 Hrs/70° C., H₂O (lbs-inch) | 23 | 25 | 28 | 30 | 10 | 20 | 30 | 33 |
| Max. Polymer 1* | | | 31 | | | | | |
| Max. Polymer A* | | | | | | | 38 | |
| Percent Cure** | | | | | | | | |
| 1 Hr. | 52 | 59 | 81 | 81 | 6 | 23 | 34 | 54 |
| 4 Hrs. | 59 | 74 | 81 | 89 | 9 | 26 | 60 | 66 |
| 16 Hrs. | 70 | 78 | 89 | 96 | 20 | 49 | 71 | 86 |

*Value determined by curing, in the presence of 0.1% by weight dibutyltin dilaurate, in a pressure cooker (121° C.) for 8 hours.
**Calculated using formula:

$$\text{Percent cure} = \frac{\text{Rheometer (measured at time indicated)} - \text{Rheometer (original)}}{\text{Rheometer (max)} - \text{Rheometer (original)}} \times 100$$

Preparation of silane modified polyethylenes was carried out as previously described using the formulations set forth below, wherein amounts are in parts by weight.

|  | Polymer B | Polymer C |
|---|---|---|
| Polyethylene having a melt index of 2.0 | 100 | 100 |
| Vinyl-tris(n-butoxy) silane | 7.65 | — |
| Vinyl-tris(isobutoxy) silane | — | 7.65 |
| Polymerized 1,2-dihydro-2,3,4-trimethyl quinoline | 0.12 | 0.12 |
| Polyethylene masterbatch containing 1.5 percent by weight di-α-cumyl peroxide | 17.6 | 17.6 |

The polyethylene of the masterbatch had a melt index of 2.0.

Rheometer determinations were made with respect to the silane modified polyethylenes, in a manner previously described, before and after the addition thereto of a metal carboxylate, dibutyltin dilaurate. These determinations are set forth in Table III.

TABLE III

Cure Speed As A Function Of The Amount Of The Metal Carboxylate

|  | Polymer B | | | | Polymer C | | | |
|---|---|---|---|---|---|---|---|---|
|  | Control 6 | Example 4 | Example 5 | Example 6 | Control 7 | Example 7 | Example 8 | Example 9 |
| Percent by weight dibutyltin dilaurate | 0.03 | 0.1 | 0.5 | 1.0 | 0.03 | 0.1 | 0.5 | 1.0 |
| Original Rheometer (lbs-inch) | 8 | 8 | 8 | 8 | 7 | 7 | 7 | 7 |
| After tin Addition (lbs-inch) | 8 | 9 | 11 | 11 | — | — | — | — |
| ½ Hr/70° C. (lbs-inch) | — | — | — | — | 10 | 8 | 8 | 12 |
| 1 Hr/70° C., (lbs-inch) | 10 | 12 | 16 | 17 | 9 | 9 | 10 | 12 |
| 4 Hrs/70° C., (lbs-inch) | 14 | 18 | 23 | 27 | 14 | 15 | 17 | 23 |
| 16 Hrs/70° C., H$_2$O (lbs-inch) | 20 | 34 | 36 | 37 | 20 | 32 | 38 | 39 |
| Max. Polymer B* | | 38 | | | | | | |
| Max. Polymer C* | | | | | | 40 | | |
| Percent Cure** | | | | | | | | |
| 1 Hr. | 7 | 13 | 27 | 30 | 7 | 7 | 10 | 16 |
| 4 Hrs. | 20 | 33 | 50 | 63 | 22 | 25 | 31 | 49 |
| 16 Hrs. | 40 | 87 | 93 | 97 | 40 | 76 | 94 | 97 |

*Value determined by curing, in the presence of 0.1% by weight dibutyltin dilaurate, in a pressure cooker (121° C.) for 8 hours.
**Calculated using formula:

$$\text{Percent cure} = \frac{\text{Rheometer (measured at time indicated)} - \text{Rheometer (original)}}{\text{Rheometer (max)} - \text{Rheometer (original)}} \times 100$$

The cure speeds of Polymer B and Polymer C compare favorably with the cure speed of Polymer 1, a polymer of commerce, at metal carboxylate loadings of at least 0.1 percent by weight.

The examples which follow illustrate the advantages of the addition of monomeric, hydrolytically reactive organo silanes.

Silane modified polymers were prepared by adding the materials of Formulation I to a Brabender mixer and fluxing the materials to a temperature of 140° C. At this point, materials of Formulation II were added to the Brabender and the resultant mixture blended to a stable torque. Contents of the Brabender mixer were then brought to a temperature of 175° C. and maintained at this temperature for five minutes. Formulation III was then added and the resultant mixture homogenized. Contents were discharged from the Brabender mixer, formed into plaques and rheometer determination made.

Formulations I, II and III and rheometer determinations are set forth below, wherein amounts are in percent by weight.

|  | Polymer (Percent by Weight) | | |
|---|---|---|---|
|  | D | E | F |
| Formulation I | | | |
| Ethylene-ethyl acrylate copolymer having a melt index of 3.5 and containing about 17 percent combined ethyl acrylate | 40.20 | 40.25 | 39.90 |
| Aluminum Trihydrate (water-containing filler) | 56.25 | 56.30 | 55.85 |
| Polymerized 1,2-dihydro-2,3,4-trimethyl quinoline (antioxidant) | 0.10 | 0.10 | 0.10 |
| Vinyl-tris(2-methoxyethoxy) silane (coupling agent) | 0.25 | 0.25 | 0.25 |
| Formulation II | | | |
| Vinyl-tris(isobutoxy) silane | 1.3 | — | — |
| Dicumyl peroxide mixture (wt. ratio of silane to peroxide 16 to 1) | | | |
| Vinyl-tris(isopropoxy) silane | — | 1.2 | — |
| Dicumyl peroxide mixture (wt. ratio of silane to peroxide 14 to 1) | | | |
| Vinyl-tris(2-ethylhexoxy-1) silane | — | — | 2.0 |
| Dicumyl peroxide mixture (wt. ratio of silane to peroxide 25 to 1) | | | |
| Formulation III | | | |
| 2-Ethyl hexyl diphenyl phosphate (plasticizer) | 1.5 | 1.5 | 1.5 |
| Polymerized 1,2-dihydro-2,3,4-trimethyl quinoline | 0.4 | 0.4 | 0.4 |
| Rheometer - lbs-inch | 6 | 8 | 3 |

Samples of silane modified polymers D, E and F were fluxed in a Brabender mixer and the quantity of dibutyltin dilaurate or dibutyltin dilaurate and vinyltrimethoxy silane indicated in Table IV were added to the Brabender and the resultant mixtures blended to a temperature of 130° C. over a period of one minute. In each case, rheometer determinations were made in order to determine the effect of the additives. Amounts noted in Table IV are based on the weight of the polymer samples used.

TABLE IV

| Silane Modified Polymer | Before Addition of Tin | Rheometer - lbs-inch After Addition of 0.5 percent by weight Tin | Increase | After Addition of 0.5 percent by weight silane then 0.5 percent by weight Tin | Increase |
|---|---|---|---|---|---|
| D | 6 | 14 | 8.0 | 6.5 | 0.5 |
| E | 8 | 19.5 | 11.5 | 8.0 | 0.0 |
| F | 3 | 11 | 8.0 | 5.5 | 2.5 |

It is clear from the results of Table IV that the addition of a monomeric, hydrolytically reactive silane to a composition of a silane modified polymer and a metal carboxylate silanol condensation catalyst has a dramatic effect with respect to stabilizing the viscosity of the polymer.

The data which is set forth in Table V, which follows, also establish the necessity of adding the monomeric, hydrolytically reactive silane to the silane modified immediately prior to or concurrently with the addition of the metal carboxylate.

Silane modified polymers, G and H, were prepared in a manner described for Polymer D using formulations set forth in Table V, wherein amounts are in percent by weight, and rheometer determinations were made immediately after discharge from the Brabender mixer.

Samples of Polymers G and H were fluxed in a Brabender mixer and 0.5 percent by weight vinyltrimethoxy silane added to the fluxed polymers. The resultant mixtures were then blended to a temperature of 130° C. Test samples were removed and rheometer determinations made.

The original mixtures of polymer and silane were exposed to ambient air for a period of three days. At the end of the three day period, each mixture was fluxed in a Brabender mixer and 0.5 percent by weight dibutyltin dilaurate blended in. Rheometer determinations were made immediately following the "blending in" of the dibutyltin dilaurate.

Rheometer determinations are set forth in Table V.

TABLE V

|  | Polymer G | Polymer H |
|---|---|---|
| Ethylene-ethyl acrylate copolymer having a melt index of 3.5 and containing 17 percent by weight combined ethyl acrylate | 40.2 | 39.85 |
| Aluminum trihydrate | 56.25 | 55.8 |
| Vinyl-tris(2-methoxyethoxy) silane | 0.25 | 0.25 |
| Polymerized 1,2-dihydro-2,3,4-trimethyl quinoline | 0.05 | 0.05 |
| Vinyl-tris(isobutoxy) silane, dicumyl peroxide mixture (wt. ratio of silane to peroxide 12 to 1) | 1.30 | — |
| Vinyl-tris(2-ethylhexoxy-1) silane, dicumyl peroxide mixture (wt. ratio of silane to peroxide 25 to 1) | — | 2.1 |
| 2-Ethyl hexyl diphenyl phosphate | 1.5 | 1.5 |
| Polymerized 1,2-dihydro-2,3,4-trimethyl quinoline | 0.45 | 0.45 |
| Rheometer - lbs-inch |  |  |
| original | 9 | 8 |
| after addition of monomeric silane | 9 | 8 |
| after addition of dibutyltin dilaurate | 28 | 23 |

Compositions of Table VI, which follows, further exemplify the present invention with respect to a wide variety of monomeric, hydrolytically reactive silanes.

The procedure utilized in formulating the compositions was to blend the monomeric silane and/or dibutyltin dilaurate with the ethylene-vinyltrimethoxy silane copolymer over a period of one minute at a temperature of 130° C.

Amounts noted in Table VI are in parts by weight.

TABLE VI

| Copolymer of ethylene-vinyltrimethoxy silane, having a rheometer as received of 7 lbs-inch | 100 | 100 | 100 | 100 | 100 | 100 | 100 |
|---|---|---|---|---|---|---|---|
| Bis(trimethylsilyl) acetamide | — | 0.25 | — | — | — | — | — |
| N,N—dimethylaminotrimethyl silane | — | — | 0.25 | — | — | — | — |
| N,N—dimethylaminooctyldimethyl silane | — | — | — | 0.25 | — | — | — |
| Ethyltriacetoxy silane | — | — | — | — | 0.25 | — | — |
| Methyltris(methylethylketoxime) silane | — | — | — | — | — | 0.25 | — |
| Vinyltrimethoxy silane | — | — | — | — | — | — | 0.25 |
| Dibutyltin dilaurate | 0.1 | 0.1 | 0.1 | 0.1 | 0.1 | 0.1 | 0.1 |
| Rheometer (lbs-inch) | 14.5 | 10 | 11.5 | 10.5 | 6.5 | 7 | 9 |

The data of Table VI show that monomeric, hydrolytically reactive silanes are capable of preventing an undesirable increase in viscosity of a water-curable polymer, upon the addition to the polymer, of a metal carboxylate silanol condensation catalyst.

What is claimed is:

1. A composition of matter comprising a preformed, thermoplastic polymer based on a major proportion of ethylene, said thermoplastic polymer having pendant silane moieties of the formula:

wherein R is a straight chain hydrocarbon radical having 4 to 18 carbon atoms or a branched chain hydrocarbon radical having 3 to 18 carbon atoms, each V is a hydrocarbon radical having 1 to 18 carbon atoms inclusive or an —OR radical wherein R is as previously defined; and as the sole silanol condensation catalyst a metal carboxylate in an amount of about 0.1 percent to about 5 percent by weight based on the weight of said preformed polymer.

2. A composition of matter as defined in claim 1 wherein the metal carboxylate is present in an amount of about 0.25 to about one percent by weight based on the weight of the polymer.

3. A composition of matter as defined in claim 1, wherein the metal carboxylate is dibutyltin dilaurate or dioctyltin maleate.

4. A composition of matter as defined in claim 1 wherein the metal carboxylate is present as a masterbatch composition in a thermoplastic polymer matrix.

5. A composition as defined in claim 4 wherein the metal carboxylate is dibutyltin dilaurate or dioctyltin maleate.

6. A composition of matter as defined in claim 5 wherein the thermoplastic polymer matrix is a polyethylene.

7. A composition of matter as defined in claim 1 wherein the preformed thermoplastic polymer is an olefin polymer.

8. A composition of matter as defined in claim 7 wherein the olefin polymer is polyethylene.

9. A composition of matter as defined in claim 7 wherein the olefin polymer is a copolymer of ethylene and ethyl acrylate.

10. A composition of matter as defined in claim 7 wherein the olefin polymer is a copolymer of ethylene and vinyl acetate.

11. A composition of matter as defined in claim 7 wherein the olefin polymer is a polymer of ethylene and at least one $C_3$ to $C_8$ alpha olefin.

12. A composition of matter as defined in claim 11 wherein the alpha olefin is propylene.

13. A composition of matter as defined in claim 11 wherein the alpha olefin is butene-1.

14. A composition of matter as defined in claim 11 wherein the alpha olefin is hexene-1.

15. A composition of matter as defined in claim 1 wherein the silane moieties are derived from vinyl-tris(n-butoxy)silane.

16. A composition of matter as defined in claim 1 wherein the silane moieties are derived from vinyl-tris-(isobutoxy)silane.

17. A composition of matter as defined in claim 1 wherein the silane moieties are derived from vinyl-tris(n-dodecyloxy)silane.

18. A composition of matter as defined in claim 1 wherein the silane moieties are derived from vinyl-tris(2-ethylhexoxy-1)silane.

19. A composition of matter comprising a preformed polymer which is polyethylene, an ethylene-ethyl acrylate copolymer, an ethylene-vinyl acetate copolymer, or an ethylene-silane copolymer, each having pendant silane moieties of the formula:

wherein R is straight chain hydrocarbon radical having 4 to 18 carbon atoms or a branched chain hydrocarbon radical having 3 to 18 carbon atoms, each V is a hydrocarbon radical having 1 to 18 carbon atoms inclusive or an —OR radical wherein R is as previously defined and as the sole silanol condensation catalyst, dibutyltin dilaurate in an amount of about 0.1 to about 5 percent by weight based on the weight of said preformed polymer.

20. A composition of matter as defined in claim 19 wherein the dibutyltin dilaurate is present in an amount of about 0.25 to about one percent by weight based on the weight of said preformed polymer.

21. A composition of matter as defined in claim 19 wherein the silane moieties are derived from vinyl-tris(n-butoxy)silane.

22. A composition of matter as defined in claim 19 wherein the silane moieties are derived from vinyl-tris-(isobutoxy)silane.

23. A composition of matter as defined in claim 19 wherein the silane moieties are derived from vinyl-tris(n-dodecyloxy)silane.

24. A composition of matter as defined in claim 19 wherein the silane moieties are derived from vinyl-tris(2-ethylhexoxy)silane.

* * * * *